Patented June 4, 1935

2,003,421

UNITED STATES PATENT OFFICE 2,003,421

INDOL COMPOUND

Fritz Ballauf and Albert Schmelzer, Cologne-Mulheim, Germany, assignors to General Aniline Works, Inc., New York, N. Y., a corporation of Delaware No Drawing. Application March 24, 1932, Serial No. 601,050. In Germany April 2, 1931

7 Claims. (Cl. 260—48)

The present invention relates to new indol compounds, more particularly it relates to compounds of the probable general formula:

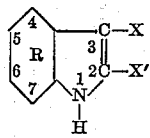

wherein the benzene nucleus "R" either contains as substitutes a hydroxy group and a carboxylic acid group in ortho-position to each other, or contains condensed thereto in the positions 4,5 or 6,7 a benzene nucleus, said benzene nucleus bearing as substituents a hydroxy group and a carboxylic acid group in ortho-position to each other, "X" stands for hydrogen, akyl or a radical of the benzene series and "X'" stands for alkyl or a radical of the benzenes series.

Our new compounds are prepared by causing carbon-dioxide to act upon the alkali metal salts of the corresponding hydroxy-indols or on the corresponding hydroxy-indols in the presence of an alkali metal carbonate under superatmospheric pressure and at an elevated temperature, as is more fully described in the following examples.

The starting hydroxy-indols are obtainable, for example, from the corresponding sulfonic acids of the indols or naphthindols by alkali fusion.

These indol-sulfonic acids again can be prepared according to known methods, for example, by transforming the corresponding phenyl- or naphthylamino-sulfonic acids, such as 1-aminobenzene-2- or -3- or -4-sulfonic acid or 1- or 2-aminonaphthalene-5- or -6- or -7-sulfonic acid into a ketone-hydrazone by means of a ketone containing a methylene group or a methyl group in the vicinal position to the carbonyl group, for example, with acetone, diethylketone, ethylmethylketone, acetophenone, ethylphenylketone, and effecting the synthesis of the indol by heating with an acid condensing agent, such as zinc chloride or a 70–90% aqueous sulfuric acid, these methods being more fully described in U. S. Patents No. 1,866,956 and No. 1,906,221.

The new hydroxy-indol-carboxylic acids are generally yellowish, water insoluble substances; they are soluble in aqueous alkalis from which solutions they may be reprecipitated by the addition of mineral acid, and are valuable intermediate products in the manufacture of dyestuffs.

The invention is illustrated by the following examples, without being limited thereto:

Example 1.—25 parts by weight of 6-hydroxy-2,3-diphenylindole are converted into a salt by means of 5.5 parts by weight of potassium hydroxide, and 50 parts by weight of potassium carbonate are added. Carbonic acid is then introduced under pressure, and a temperature of 220° C. and 60 atmospheres pressure are maintained for eight hours. The resulting 6-hydroxy-2,3-diphenylindol-5-carboxylic acid of the formula:

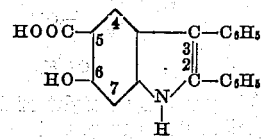

is a yellowish powder, showing the typical blue coloration with ferric chloride.

Example 2.—25 parts by weight of 8-hydroxy-2-phenyl-α-naphthindol are converted into the corresponding salt by means of 6 parts by weight of potassium hydroxide, and 150 parts by weight of potassium carbonate are added. Carbonic acid is then introduced under pressure, and a temperature of 220° C. and 60 atmospheres pressure are maintained for 8 hours. The 8-hydroxy-2-phenyl-α-naphthindol-7-carboxylic acid thus formed is a yellowish powder showing the typical blue coloration with ferric chloride. It corresponds to the following formula:

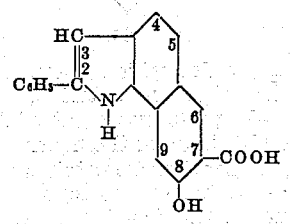

Example 3.—25 parts by weight of 2-methyl-3-ethyl-8-hydroxy-α-naphthindol are treated as described in Example 1. The 8-hydroxy-2-methyl-3-ethyl-α-naphthindol-7-carboxylic acid thus produced of the same properties given in Example 1 corresponds to the following formula:

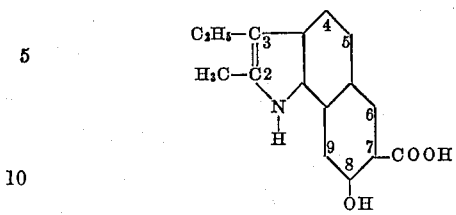

Example 4.—25 parts by weight of 2.3-dimethyl-8-hydroxy-α-naphthindol of the melting point 214° C. are treated as described in Example 1. Thus the 8-hydroxy-2.3-dimethyl-α-naphthindol-7-carboxylic acid of the following formula:

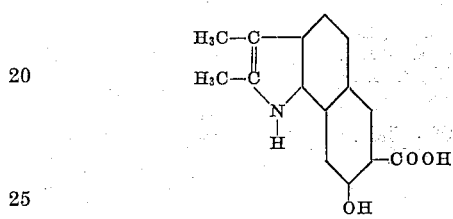

is obtained possessing the same properties as the product described in Example 1.

Example 5.—25 parts by weight of 7-hydroxy-2-phenyl-α-naphthindol of the melting point 170° C. are treated as described in Example 1. A lemon-yellow acid showing the typical blue coloration with ferric chloride is obtained. The 7-hydroxy-2-phenyl-α-naphthindol-8-carboxylic acid has the following formula:

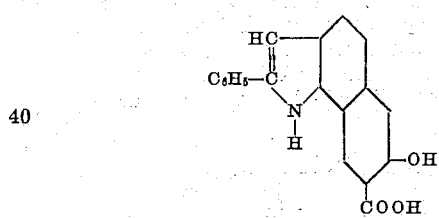

Example 6.—40 parts by weight of 2-methyl-8-hydroxy-α-naphthindol (prepared from acetone and the hydrazone of the 1-naphthylamine-7-sulfonic acid of the melting point 191° C. and recrystallized from toluene) are heated for 10 hours with 200 parts by weight of potassium carbonate at a temperature of 220° C. under carbondioxide pressure. The 2-methyl-8-hydroxy-α-naphthindol-7-carboxylic acid thus produced of the following formula:

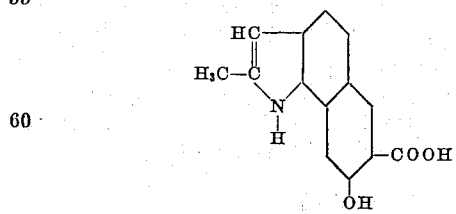

is a yellowish powder which shows the typical blue coloration with ferric chloride.

Example 7.—50 parts by weight of 8-hydroxy-2-phenyl-β-naphthindol of the melting point 235° C. after recrystallization from toluene (prepared from the hydrazone from acetophenone and 2-naphthylamine-7-sulfonic acid) are heated for 10 hours with 200 parts by weight of potassium carbonate at a temperature of 230° C. under carbondioxide pressure. The 8-hydroxy-2-phenyl-β-naphthindol-7-carboxylic acid thus produced after filtering and acidifying corresponds to the following formula:

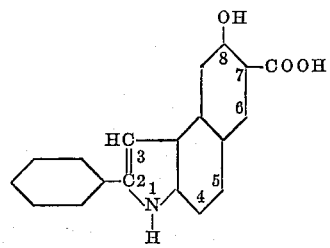

It is obtained as a yellow powder in a yield of 68% and shows with ferric chloride the typical blue coloration.

Example 8.—40 parts by weight of 3-methyl-2-phenyl-8-hydroxy-α-naphthindol of the melting point 180° C. after recrystallization from toluene (prepared from the hydrazone from ethylphenylketone and 1-naphthyl-7-sulfonic acid) are treated as described in Example 6. The 3-methyl-2-phenyl-8-hydroxy-α-naphthindol-7-carboxylic acid of the following formula:

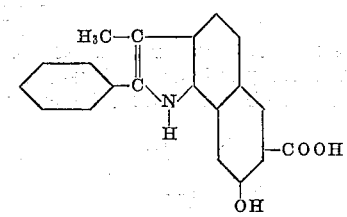

is thus obtained.

We claim:

1. The indol compounds of the general formula:

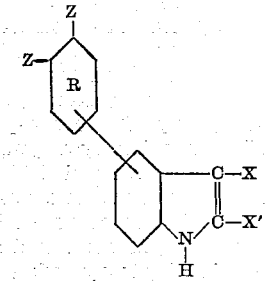

wherein "R" stands for a benzene nucleus attached in the para-position to the Z's to the benzene nucleus of the indol in the 4,5- or 6,7-positions, wherein one "Z" stands for the hydroxy group, the other "Z" stands for the carboxylic acid group, "X" stands for hydrogen or alkyl, and "X'" stands for methyl or a phenyl nucleus, being generally yellowish, water insoluble substances, soluble in aqueous alkalies and being valuable intermediate products in the manufacture of dyestuffs.

2. The indol compounds of the general formula:

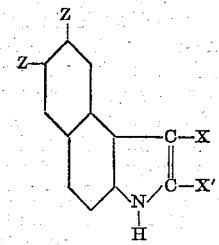

wherein one "Z" stands for the hydroxy group and the other "Z" stands for the carboxylic acid group, "X" stands for hydrogen or alkyl and "X'" stands for methyl or a phenyl nucleus, being generally yellowish, waterinsoluble substances, soluble in aqueous alkalies and being valuable intermediate products in the manufacture of dyestuffs.

3. The indol compound of the following formula:

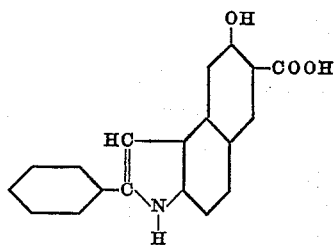

being a yellow powder and being a valuable intermediate product in the manufacture of dyestuffs.

4. Indol compounds of the general formula:

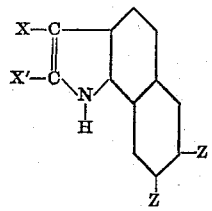

wherein one "Z" stands for the hydroxy group and the other "Z" stands for the carboxylic acid group, "X" stands for hydrogen or alkyl and "X'" stands for methyl or a phenyl nucleus, being generally yellowish, waterinsoluble substances, soluble in aqueous alkalies and being valuable intermediate products in the manufacture of dyestuffs.

5. Indol compounds of the general formula:

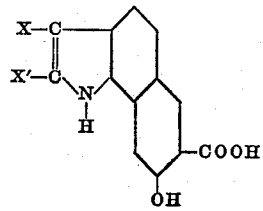

wherein "X" stands for hydrogen or alkyl and "X'" stands for methyl or a phenyl nucleus, being generally yellowish, water insoluble substances, soluble in aqueous alkalies and being valuable intermediate products in the manufacture of dyestuffs.

6. The indol compound of the following formula:

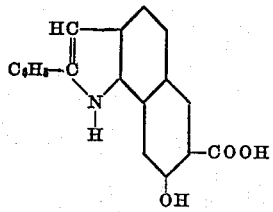

being a yellowish powder and being a valuable intermediate product in the manufacture of dyestuffs.

7. The indol compound of the following formula:

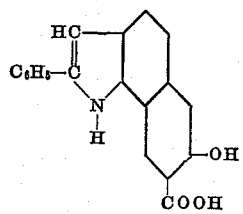

being a lemon-yellow powder and being a valuable intermediate product in the manufacture of dyestuffs.

FRITZ BALLAUF.
ALBERT SCHMELZER.